(12) United States Patent
Panyam et al.

(10) Patent No.: US 8,628,811 B2
(45) Date of Patent: Jan. 14, 2014

(54) PARTICLES OF AERATED ICE CONFECTION PRODUCTS FOR FROZEN ICE DRINKS

(75) Inventors: Dinakar Panyam, Fremont, CA (US); Madansinh Nathusinh Vaghela, Bakersfield, CA (US); Nishant Ashok Joshi, Bakersfield, CA (US); Hoo Tung Vincent Chan, Bakersfield, CA (US)

(73) Assignee: Nestec S.A., Vevey (CH)

( * ) Notice: Subject to any disclaimer, the term of this patent is extended or adjusted under 35 U.S.C. 154(b) by 289 days.

(21) Appl. No.: 12/936,632

(22) PCT Filed: Mar. 13, 2009

(86) PCT No.: PCT/EP2009/052979
§ 371 (c)(1),
(2), (4) Date: Oct. 6, 2010

(87) PCT Pub. No.: WO2009/124823
PCT Pub. Date: Oct. 15, 2009

(65) Prior Publication Data
US 2011/0027427 A1 Feb. 3, 2011

Related U.S. Application Data

(60) Provisional application No. 61/044,152, filed on Apr. 11, 2008.

(51) Int. Cl.
*A23G 9/24* (2006.01)

(52) U.S. Cl.
USPC ........... 426/305; 426/101; 426/565; 426/569; 426/393; 426/394; 426/515; 426/516; 426/518; 426/519; 426/524

(58) Field of Classification Search
USPC ................. 426/524, 518, 519, 515, 516, 393, 426/66–67, 565, 569, 100–101, 305, 307, 426/394
See application file for complete search history.

(56) References Cited

U.S. PATENT DOCUMENTS

| | | | |
|---|---|---|---|
| 1,639,122 A | 8/1927 | Whitman | |
| 2,001,477 A * | 5/1935 | Vogt | 426/123 |

(Continued)

FOREIGN PATENT DOCUMENTS

| | | |
|---|---|---|
| DE | 19750679 | 5/1999 |
| GB | 1239793 | 7/1971 |

(Continued)

OTHER PUBLICATIONS

International Search Report for International Application No. PCT/EP2009/052979 mailed on Dec. 7, 2009.

(Continued)

*Primary Examiner* — Drew E Becker
(74) *Attorney, Agent, or Firm* — K&L Gates LLP

(57) ABSTRACT

A process for preparing aerated ice confection particles by manufacturing an aerated ice confection in a mass; further freezing the mass cryogenically to a temperature close to the glass transition temperature (Tg) of the aerated ice confection to form a aerated frozen mass, and comminuting the frozen mass to aerated ice confection particles with a high surface area to volume ratio. These particles can be used for a variety of purposes but preferably are used for forming frozen ice drinks in a simple, rapid and convenient manner. This is particularly useful when a single serving of such drinks is desired as no special equipment to make the drink is required. The invention also relates to packaging for the aerated ice confection particles and methods of making frozen ice drinks from the aerated ice confection particles.

25 Claims, 1 Drawing Sheet

(56) References Cited

U.S. PATENT DOCUMENTS

| | | | |
|---|---|---|---|
| 2,598,137 A * | 5/1952 | Schulz et al. | 426/393 |
| 2,863,776 A * | 12/1958 | Lisher | 426/599 |
| 3,619,205 A | 11/1971 | Levan et al. | |
| 3,949,098 A | 4/1976 | Bangert | |
| 4,031,261 A * | 6/1977 | Durst | 426/565 |
| 4,039,693 A * | 8/1977 | Adams et al. | 426/565 |
| 4,219,581 A * | 8/1980 | Dea et al. | 426/565 |
| 4,293,580 A | 10/1981 | Rubenstein | |
| 4,310,559 A * | 1/1982 | Mita et al. | 426/101 |
| 4,551,341 A | 11/1985 | Blanie et al. | |
| 4,609,561 A | 9/1986 | Wade et al. | |
| 4,925,689 A * | 5/1990 | Getman | 426/289 |
| 4,982,577 A | 1/1991 | Milankov et al. | |
| 5,438,839 A | 8/1995 | Wardle | |
| 5,698,247 A * | 12/1997 | Hall | 426/66 |
| 5,987,898 A * | 11/1999 | Olofsson et al. | 62/63 |
| 6,099,874 A * | 8/2000 | Tucker et al. | 426/91 |
| 6,223,542 B1 | 5/2001 | Jones et al. | |
| 7,815,954 B2 * | 10/2010 | Miller et al. | 426/394 |
| 2,977,231 A1 | 4/2011 | Fox et al. | |
| 2005/0008754 A1 * | 1/2005 | Sweeney et al. | 426/590 |
| 2005/0106301 A1 * | 5/2005 | Jones | 426/524 |
| 2005/0255201 A1 * | 11/2005 | Gruhot et al. | 426/115 |
| 2006/0134274 A1 * | 6/2006 | Ladd et al. | 426/100 |
| 2006/0196194 A1 | 9/2006 | Bruggeman et al. | |
| 2008/0085342 A1 * | 4/2008 | Binley et al. | 426/66 |
| 2009/0169680 A1 * | 7/2009 | Rabault et al. | 426/61 |
| 2011/0217425 A1 * | 9/2011 | Puaud et al. | 426/101 |
| 2011/0262600 A1 * | 10/2011 | McGill | 426/112 |
| 2011/0300264 A1 * | 12/2011 | Neta et al. | 426/61 |

FOREIGN PATENT DOCUMENTS

| | | |
|---|---|---|
| GB | 1331518 | 9/1973 |
| WO | WO97/43913 | 11/1997 |
| WO | WO98/53701 | 12/1998 |
| WO | WO2006/007922 | 1/2006 |
| WO | WO2007/072187 | 6/2007 |

OTHER PUBLICATIONS

Written Opinion for International Application No. PCT/EP2009/052979 mailed on Dec. 7, 2009.

\* cited by examiner

Process flow diagram
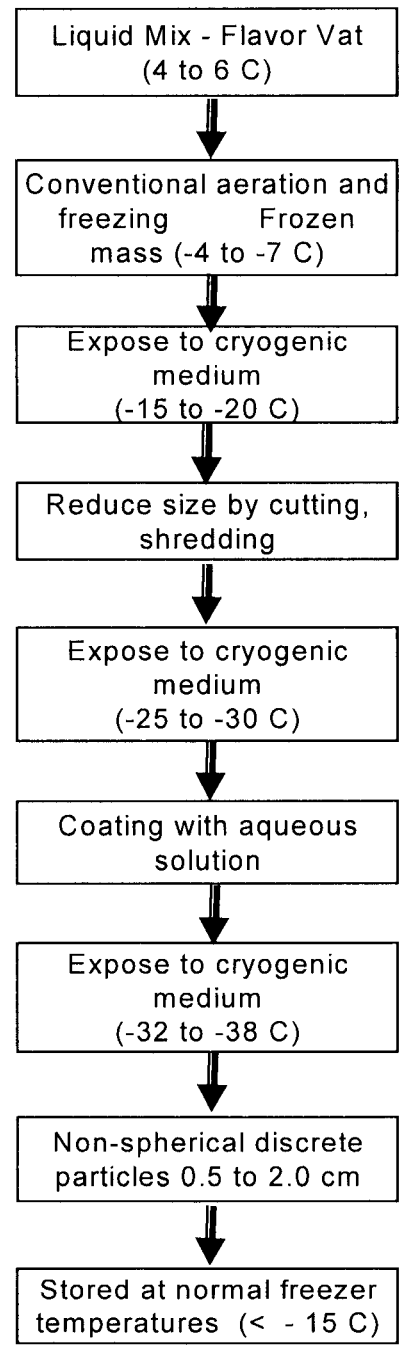

PARTICLES OF AERATED ICE CONFECTION PRODUCTS FOR FROZEN ICE DRINKS

BACKGROUND

The invention relates to a process for the manufacture of a frozen base composition having a high surface area to volume ratio to facilitate easy mixing with added liquid to make frozen beverages such as milk shakes or smoothies or other frozen ice drinks such as frozen margaritas or daiquiris. In particular, the use of a post-extrusion, secondary freezing step to further cool a frozen aerated ice confection or dessert to a temperature near its glass transition temperature followed by the alteration of the physical dimensions of the further cooled product results in aerated ice confection particles having a substantial increase in the surface area to volume ratio such that they are highly useful for forming such frozen beverages.

Ice particles are needed in order to form frozen ice drinks. Various mechanical means are used to crush ice cubes or blocks to the desired size for use in such products. Alternatively, ice particles can be made by cooling water droplets to low temperatures. The glass transition temperature (Tg) of pure water is −130° C. but the formation of a solution by the addition of solutes such as sugars will elevate this value substantially. The numerical value of Tg is a function of the weighted average molecular weight of the solutes in the solution.

Traditional ice cream manufacturing practice advocates the forming, shaping and packaging of the product close to the extrusion temperature (−4° C. to −7° C.) of ice cream when about 40 to 60% of the water in the product is frozen. In this state the product is still relatively soft and pliable and exhibits strong surface-adhesive properties. When this frozen mass is cooled further to lower temperatures a greater percentage of the water is frozen to ice and the product becomes hard and less pliable. A frozen beverage like a milkshake or smoothie is often prepared by mixing handscooped ice cream or sherbet with milk or water followed by blending using various mechanical means. While this technique is well established, it is generally conducted in fast food or restaurant establishments and not convenient for a user in the home due to the amount of equipment and effort needed to prepare a single serving.

A relatively recent trend has been towards the use of cryogenic freezing to make small beads or discrete particles or beads of predominantly spherical shape by immersion or exposure to a very cold environment such as liquid nitrogen. During these processes small droplets of liquid mix undergo a very rapid or instant drop in temperature which freezes them to a temperature below the glass transition temperature. Examples of this are found in U.S. Pat. Nos. 4,982,577, 5,438,839 and 6,223,542; US patent publications 2005/0008754A1 and 2006/0196194A1; and PCT publication WO2006/007922. As long as these cryogenically frozen particles are stored below the Tg, they will remain free flowing and not stick to each other.

Attempts have been made to use these particles for the preparation of frozen beverages in individual portions by adding a liquid such as milk to a container partially filled with these particles and shaking vigorously by hand after closing with a lid. This has not been satisfactory to date since the ice particles tend to clump together or adhere after contact with liquid. This detracts from the organoleptic properties that are desired in such products and requires further attention to break up these clumps. Generally, the level or degree of hand shaking that is necessary to break up these clumps is too high for the ordinary user, and while agitation with a spoon, whisk or manual or automatic mixing device can break up the clumps, this defeats the purpose of trying to make the product in a simple manner.

To facilitate easier mixing of the ice particles with a liquid it was thought to be desirable to provide the particles with a finer size and higher surface area to volume ratio. One way of achieving this is by converting the liquid mix to smaller entities like droplets or mist before rapidly freezing by exposing to a cryogenic medium such as liquid nitrogen. This is described in German patent DE 197 50 679, which relates to the production of ice particles from an aerated liquid mix or foam. Even though finer particles do mix more easily with a liquid, there remains a tendency for clumping or sticking after contact with the liquid and agitation still is required to make the final product.

Accordingly, there is a need for ice containing particles having enhanced properties for use in making frozen ice drink products without requiring extensive mixing, and these are now provided by the present invention.

SUMMARY OF THE INVENTION

The present invention relates to a process for preparing aerated ice confection particles which comprises preparing an elongated frozen stream of an aerated ice confection; further freezing the stream cryogenically to a temperature close to or below the glass transition temperature (Tg) of the aerated ice confection to form an amorphous glass-like solid mass that is not sticky and that has minimal surface-adhesive properties, and then comminuting the solid mass to free-flowing aerated ice confection particles.

The elongated frozen stream of the aerated ice confection is advantageously made by extruding the aerated ice confection into one or more elongated shapes. Typical aerated ice confections for use in this process include ice cream, frozen dairy dessert, sherbet, sorbet, or frozen juice, and the aerated ice confection particles preferably have a Tg of −5° C. to −15° C.

The elongated frozen stream of the aerated ice confection is cryogenically frozen by subjecting the stream to a temperature of −20° C. to −40° C. or to a lower temperature if desired. Then, the solid mass is comminuted into particles by cutting, grinding, crushing, chopping, shredding, or abrading the solid mass. The resulting aerated ice confection particles have a high surface to volume ratio of about 1 to 5 cm2/cm3 with a maximum linear dimension of about 1 mm to 2 cm and preferably 5 to 20 mm.

Optionally, the process includes coating the ice confection particles with an aqueous solution of a Tg elevating agent with cryogenic freezing to form a glassy coating on the particles that contributes to their free-flowing ability at storage temperatures. Advantageous Tg elevating agents include biopolymers having a molecular weight of 800 to 15,000 Daltons or a natural or artificial sweetener.

These resulting particles are free flowing at temperatures of −5° C. to −35° C. They can be used for a variety of purposes but preferably are used for forming frozen ice drinks in a simple, rapid and convenient manner. This is particularly useful when a single serving of such drinks is desired as no special equipment to make the drink is required.

The process further comprises packaging the aerated ice confection particles in a container such as a bag, pouch or other sealed container which is sized to hold single or multiple servings. Preferably, the container is a cup that includes a removable lid. Alternatively, the lid may be one that holds the aerated ice confection particles therein and that can be placed on a cup to introduce the aerated ice confection particles into the cup.

The invention also relates to a method of making a frozen ice drink which comprises combining a sufficient amount of the aerated ice confection particles prepared according to the processes disclosed herein with sufficient amounts of a liquid and mixing to form the drink. The aerated ice confection particles are generally present in an amount of about 10 to 90%, preferably 40 to 70% based on the total amount of aerated ice confection particles and liquid. Preferably, the aerated ice confection particles are present in a single serving size container to which the liquid is added and the mixing of the aerated ice confection particles and liquid is achieved by shaking of the container. As noted above, the container may include a removable lid wherein the lid is removed prior to introduction of the liquid into the container. Typical liquids include water, milk, fruit juice, coffee, tea, an alcoholic beverage, or a liquid beverage forming mix.

Another embodiment of the invention relates to a packaged ready to use frozen ice drink product which comprises a container and aerated ice confection particles prepared according to the processes disclosed herein. The container is generally in the form of a bag, pouch or other sealed container which is sized to hold single or multiple servings. Again, the preferred container is a cup that includes a removable lid. Alternatively, the container may be a lid that holds the aerated ice confection particles therein and that can be placed on a cup to introduce the aerated ice confection particles into the cup.

Further embodiments of the invention include methods of making a single serving of a frozen ice drink which comprises providing a cup containing a single serving of a liquid, adding aerated ice confection particles prepared according to the processes disclosed herein; and mixing the aerated ice confection particles and liquid to form the drink. Any of the products disclosed herein can be used to facilitate the combining of the liquid with the aerated ice confection particles to form the drink.

When the container is a bag, pouch or other sealed container which is sized to hold single or multiple servings, the liquid can be provided in a cup with the aerated ice confection particles added to the liquid in the cup with stirring to form the drink. When the container is a cup which is sized to hold a single serving of the drink, and the liquid can be added to the aerated ice confection particles with stirring or shaking to form the drink. When the cup includes a removable lid, the lid can be removed prior to introduction of the liquid into the cup and then replaced to allow shaking of the cup to mix the aerated ice confection particles with the liquid. Generally, hand shaking for approximately 20 to 80 seconds and preferably 30 to 60 seconds is sufficient for most single size servings.

The invention also relates to free-flowing aerated ice confection particles comprising comminuted frozen ice confection particles having a Tg of −15° C. to −35° C. and a high surface to volume ratio of about 1 to 5 cm2/cm3 with a maximum linear dimension of about 1 mm to 2 cm and preferably 5 to 20 mm. These particles can be used to form a milkshake or other frozen ice drink.

The invention also relates to the use of a conventional aerated ice confection to create free-flowing aerated ice confection particles by preparing an elongated frozen stream of the aerated ice confection; further freezing the stream cryogenically to a temperature close to or below the glass transition temperature (Tg) of the aerated ice confection to form an amorphous glass-like solid mass that is not sticky and that has minimal surface-adhesive properties, and then comminuting the solid mass to free-flowing aerated ice confection particles. Typically, the particles have a high surface to volume ratio of about 1 to 5 cm2/cm3 with a maximum linear dimension of about 1 mm to 2 cm and preferably 5 to 20 mm.

BRIEF DESCRIPTION OF THE DRAWING FIGURES

FIG. 1 is a flow chart of the present method illustrating preferred processing steps.

DETAILED DESCRIPTION OF THE PREFERRED EMBODIMENTS

The first step of the process for preparing high surface area aerated ice confection particles of the invention relates to the manufacture of an aerated ice confection. Typically, the aerated ice confection may be any conventional milk-based frozen confection formulation. Such formulations include ingredients such as fat, non-fat milk solids, sweeteners, stabilizers, emulsifiers and water in various proportions that are well known to the skilled artisan. The various ingredients are mixed together to form an ice confection mix composition, the composition is then homogenized, pasteurized, cooled, optionally aged at about +2° C. to +6° C. before freezing. Freezing is generally done with stirring and with injection of air in a freezer to provide a degree of overrun of the order of 10 to 100%.

The numerical value of Tg for ice cream or a frozen dessert depends on a number of factors but are predominantly driven by the composition, in particular, the concentration of low molecular weight sugars, and the rate of cooling. For the present invention, a Tg that is similar to that of conventional ice confection mixes or formulations is preferred. One useful ice cream formulation contains 0 to 12% fat, and preferably 2 to 12% fat, 4 to 10% non-fat milk solids, 10 to 25% sweeteners, 0 to 0.5% stabilizers, at least 0.2% propylene glycol monoester of fatty acid as primary emulsifier, and has an overrun of 10 to 100% by volume.

There also are fruit juice mixtures that are suitable as frozen cream confections similar to ice cream or related novelties. Descriptions of these mixtures can be found in U.S. Pat. Nos. 2,977,231; 3,949,098; 4,293,580; 4,551,341 and 4,609,561. One useful fruit/water confection contains 0 to 100% fruit juice, 0 to 25% sweeteners, 0 to 0.5% stabilizers, at least 0.2% propylene glycol monoester of fatty acid as primary emulsifier, and an overrun of 5 to 70%.

The frozen composition is then provided in a particular shape for further processing. The shape may be any mass that is relatively continuous, easily handled and processable into particles. Typically, the mass is prepared in the shape of an elongated solid or semi-solid stream of one or more lines, strands, ropes, rods or the like with each having preferred cross section dimensions of about 0.5 to 2 cm diameter. These streams are preferably already cooled and hardened in a conventional hardening tunnel.

Next, each stream is rapidly frozen cryogenically to a temperature that is close to the Tg of the ice confection. The percent of the frozen water increases with decreasing temperature and the product becomes harder and less pliable. At close to the Tg, the mobility of the molecules and the rates of crystallization are substantially reduced. This allows the process of comminuting without detrimental changes to the texture or other attributes of the product. As more and more of the water is frozen the sugars in the composition become increasingly concentrated in the remaining unfrozen water, leading to a highly concentrated and very viscous unfrozen phase. Soon a non-equilibrium state is reached when the crystallization of the solute (sugars or sweeteners) as well as that of the remaining water are hindered by very high viscosity. At this metastable state, the viscosity and the low temperature restrict diffusion and molecular motion respectively and the material takes on the form of an amorphous glass-like solid. This is referred to as the Tg of the composition. Furthermore at temperatures close to or below the Tg, the product is not sticky and has minimal surface-adhesive tendency.

The rapid cryogenic cooling is conveniently conducted in a chamber that is held at a temperature that is below the Tg of the composition. Cooling is provided by liquid nitrogen or similar cryogenic medium as generally known by a skilled artisan. The stream or mass is moved along a conveyor that passes through the chamber or is introduced onto the chamber by gravity to be cooled to the appropriate temperature and become frozen.

The cryogenically frozen mass is then processed to form high surface area particles. This is done by subjecting the mass to a comminution step. The mass may be subjected to cutting, grinding, crushing, chopping, shredding, abrading or other operations that create or remove particles from the mass. Any of a wide variety of knives, cutting blades, grinding wheels, cutting wires or similar equipment can be used in this step depending upon the size, shape and number of the frozen elongated streams. There is no criticality to the arrangement of cutting implements or to the size and shape of the frozen elongated streams provided that the streams can be subjected to the comminution action to form the particles. There is also no criticality to the exact size and shape of the particles as long as they are free-flowing at storage temperatures and are provided in the desired size range of around 2 to 5 cm$^3$ with maximum diameters of about 1 to 1.75 cm. These aerated ice confection particles have a weight of about 0.5 to 3 grams, and a surface area of 1.5 to 5 cm$^3$.

The resultant discrete aerated ice confection particles remain free flowing and non-sticking provided that they are kept at a temperature below their Tg. The aerated ice confection particles are collected and stored at or below that temperature.

As noted above, the invention provides aerated ice confection particles having Tg values that are in the range of normal refrigerator freezer temperatures so that handling by conventional storage and distribution routes is possible. While this can be achieved by the selection of the ice confection that is used, it is optionally possible to coat the particles with an aqueous base that includes a Tg elevating agent comprising one or more of Tg elevating solutes, flavor and color components. This is done by forming an aqueous solution that includes the Tg elevating agent so that it is higher than the desired product storage temperature. Sugars like trehalose, polysaccharides, low DE maltodextrins and starches are generally known to increase the glass transition temperature and can be added to the particles by coating the particles with an aqueous solution of such sugars. A skilled artisan can develop the preferred solutions to achieve the desired Tg values.

Other solutions of Tg elevating agents can also be used to coat the particles. Such agents include macromolecular biopolymeric of relatively long chain length, e.g., greater larger than 800 to 1000 Daltons, or starch based syrups up to a maximum of about 15,000 Daltons. These agents impart a Tg at a temperature range that is in line with conventional refrigeration/freezer equipment. Various starches and other polysaccharides are known to have a Tg in the range of around 180° C. to 200° C. in their dry state. These differ based on molecular weight and other properties such as water content, gelatinization temperature, and storage time. When these type materials are mixed with water, the resulting solution containing about 5% to 70% wt. water has a Tg in the desirable range of −5° C. to −10° C. These solutions can be coated onto the particles by mixing in a suitable vat or vessel that is held at a temperature that is lower than that of the particles. The solution is added slowly and sequentially so that it can be mixed with and freeze upon the particles to form a glassy coating.

A preferred biopolymer macromolecule is a starch such as corn, wheat or potato starch and related partially enzymatically degraded starch syrups. Such preferred syrups have dextrose equivalents ("DE-values") of between about 1 and 10 and have a molecular weight of about 5,000 to 15,000 Daltons. Conveniently, these starches or starch syrups can be enzymatically treated to control viscosity and to also provide a desired level of sweetness. Most preferred are starch syrups such as corn syrup. It is also possible to use other macromolecular components to increase the glass transition temperature of respective watery solutions. Such macromolecular components include other polysaccharides (e.g. maltodextrins, polydextroses having a dextrose equivalent of between 1 and 10, pectins, carrageens, galactomannans, xanthans and celluloses or microcellulose materials and their derivatives). These may also impart other beneficial functions such as nutritional or non-digestible properties, sweetness, texture and demixing stability to the composition. The molecules may be linear or branched or otherwise provided that they otherwise fall within the other parameters described herein. The biopolymer can be applied to the cryogenically frozen ice confection particles to coat them. This can be achieved in a simple mixing device that is held at a temperature below the Tg of the particles.

Other materials can be added to the composition to achieve a Tg that is maintained in the preferred range of −5° C. to −15° C. Various sweeteners can be added. High amounts of low molecular weight sweeteners like sucrose are not desirable since sucrose acts as a plasticizer decreasing the Tg of the composition. Some smaller amounts of sugar can be added provided that the starch is increased adequately to maintain the Tg in the desired range. Artificial sweeteners may be added instead of sugar, but these would be in very low amounts (tenths of a percent) to avoid the imparting of excessive sweetness. The artificial sweetener may be saccharin, cyclamates, acetosulfame, L-aspartyl based sweeteners such as aspartame, and mixtures of these. If an artificial sweetener is used, it may be suitably combined with a bulking agent. Preferred sweeteners include sucralose and acesulfame potassium. Erytritol and other high intensity sweeteners can also be used.

After a coating of the Tg elevating agent is applied, the coated particles are further exposed to a cryogenic medium to form or maintain the glassy shell around the particles. This shell contributes to the ability of the particles to be free flowing at the desired product storage temperature.

An overall view of the preferred process is shown in FIG. 1. First, a liquid mix of the aerated ice confection is provided in a flavor vat at approximately 4° C. to 6° C. The mix is subjected to conventional aeration and freezing with an exit temperature from the freezer of −4° C. to −6° C. as an elongated frozen mass. Exposure to a cryogenic medium lowers the temperature of the frozen mass to −15° C. to −17° C. when it becomes substantially harder. A comminution operation at this temperature reduces the size of the frozen mass and converts it into discrete particles which are then again exposed to a cryogenic medium with a resulting decrease in temperature to −25° C. to −30° C. An aqueous based coating containing Tg elevating compounds, such as sugars and/or flavoring and/or color can be used to coat the discrete particles produced in the previous step. Thereafter the coated particles are exposed to a final cryogenic medium at a temperature of around −35° C. to form a small non-spherical discrete particles having a size of 5 to 20 mm along their principal axes. These particles have a high surface to volume ratio of about 1 to 5 cm2/cm3 to facilitate easy, rapid and convenient mixing with liquids to form frozen ice drinks.

Another embodiment of the present invention is to provide a packaged product that enables consumers to make milk shakes and smoothies at home on demand in a simple and easy way. The high surface area aerated ice confection particles produced according to the methods described herein are most preferably packaged in a container that includes a removable lid. The product is maintained in a frozen condition until use. At that time, the lid is removed, milk or another liquid is added, the lid is replaced and the container is shaken by hand to form a thick and uniform blend.

The container can be of any suitable single serving size. Typically, the container will be able to accommodate a 12 ounce milk shake or smoothie product, but other container sizes such as those that can hold 4, 8, 16 or 20 ounces of product can be used. Typical materials for the container are treated paper, paperboard, plastics, paper-plastic laminates, paper-foil composites, or any other material that is used for holding fluids or beverages. Generally, styrofoam is preferred due to its insulating properties. The shape of cup and lid are not critical and conventional cylindrical shapes are entirely suitable.

The high surface area aerated ice confection particles of the invention are placed into the container depending upon the size of the product. For a 12 ounce product, approximately 7 to 10 ounces of aerated ice confection particles are packaged in the container.

The container is packaged with a lid, typically made of a plastic material and having a configuration that releasably engages the rim of the container so that the lid can be applied to the container after the aerated ice confection particles are placed therein, but which can be easily removed when the liquid is to be added to the container. Typically, the material of the lid is a thermoformable plastic so that it can be provided in the desired shape and have the necessary properties to function as described. Typically, the lid is temporarily removed so that a fluid can be added to the container.

Other packaging arrangements can be provided. The aerated ice confection particles can be provided in a pouch or sealed bag for storage at freezer temperatures until use. At that time, the user can simply open the bag, pour out the desired amount of particles in a container or cup, and then mix in the fluid. The particles can be provided in a lid that is intended to fit on a standard size cup. The lid includes a seal that is removed to allow the aerated ice confection particles to fall into the cup for mixing with liquid that is already present in the cup of that is subsequently added after the particles are provided in the cup. Thereafter, the lid prevents leakage as the cup is shaken to mix the particles and liquid to form the drink. Alternatively, the particles can be directly added into the fluid in the cup with stirring to form the final frozen ice drink.

Various combinations of products can be achieved by the use of an appropriate aerated ice confection particle-fluid combinations. First of all, the aerated ice confection particles can be made from any one of a number of different flavors of ice cream, sherbert, sorbets, frozen juice or the like, including low fat or light varieties. An initial determination of the flavor can be made upon the selection of the flavor of the particles. Next, the particular fluid can be selected to further enhance or complement the flavor of the particles. Any liquid can be used to achieve the desired product characteristics. Typical fluids such as water, milk, chocolate or other flavored milk, various fruit juices or mixtures thereof, coffees, teas or similar beverages, alcoholic beverages, such as tequila, vodka or others, and beverage forming mixes, such as marguerite or daiquiri mixes. From this non-exhaustive listing, it is seen that a multitude of combinations exist for forming single or multiple servings of all different kinds of frozen ice beverages. Generally, fluids such as water, whole milk, chocolate milk, skim milk or the like can be used to obtain a milk shake, or a fruit juice or fruit drink can be used when it is desired to obtain a smoothie or slush product.

When a smoothie or slush frozen ice product is to be made, water or a juice is often used. Preferably, these juices are made of natural ingredients obtained from a fruit, vegetable or edible plant by crushing, squeezing or related operations. These juices may by filtered, strained, passed through a sieve, resin beds, clay or diatomaceous earth bed or filters, or ion exchange resins to give a juice, a juice concentrate, purees, and so-called modified juices. Specific types of juices which can be utilized in the present invention include fruit juice, concentrated fruit juice, fruit puree, fruit puree concentrate, modified juices, as well as modified concentrated juices and the like. Modified juices, for instance, would include ion exchange treated and/or ultrafiltered juices, or deodorized and decolorized ones. Examples of a few of the many specific juices which can be utilized in the product of the invention include, for example, peach concentrate, pear concentrate, blackberry puree, cranberry juice, apple concentrate, white grape juice, orange juice concentrate, grape concentrate, lemon juice concentrate, apple juice concentrate, etc. Of course, many other types of juices whether in the form of a puree, concentrate, or a juice can be utilized, depending upon the desired end flavor.

If desired, the fluid or liquid itself can include the necessary flavorants or colorants to achieve the desired flavor or color of the final product. These flavorants or colorants can already be combined in the liquid that is to be added or multiple liquids, one of milk or juice, a separate flavorant liquid and/or a separate colorant liquid can be added depending upon the desired properties of the final product. Alternatively, the flavorants or colorants can be added after the product is formed and then combined therein by use of a spoon or straw. This enables a partially colored or flavored product to be formed if desired.

The aerated ice confection particles can be packaged in a number of different ways. Conveniently, the aerated ice confection particles can be provided in a bag, pouch or other sealed container that is used for storage and shipping. This container can be of the same type used for transporting ice cream products. Alternatively, the container can be a cup or other vessel which is used both for transport and storage of the aerated ice confection particles as well as for preparing the frozen ice drink.

In a preferred embodiment, the liquid is added into a cup or similar container that holds the aerated ice confection particles and that includes a lid. The lid is removed to introduce liquid into the cup and then is replaced so that the liquid and aerated ice confection particles can be shaken by hand for a sufficient period of time to form the frozen ice drink. Generally, hand shaking for approximately 20 to 80 seconds and preferably 30 to 60 seconds is sufficient for most single size servings. The amount of liquid would generally vary from about 10% to 90% by weight based on the weight of the particles and liquid. The specific liquid and particles selected, along with the resulting desired thickness of the frozen product would contribute to the variation of the amount of liquid in the product. Of course, a skilled artisan can conduct routine tests to determine the preferred amount of liquid to use.

There is a significant difference in organoleptic properties between US and European frozen beverages. The US market generally prefers a colder and grainer beverage, whereas the European marked prefers a more fluid and less cold product. Both types can be made according to the present invention by varying the sizes and relative amounts of particles and liquid in the beverage. The different sizes of the aerated ice confection particles that are provided by the present invention are intended to address the different markets for such products. The larger particle sizes are more desirable when a more grainy US type product is desired, while the smaller particles are more desirable for European type products. In addition, the higher amounts of particles relative to the liquid are more desirable when a "colder" US type product is desired, while the lesser amounts of particles are more desirable for European type products. On a weight basis, the relative amounts of aerated ice confection particles and liquid range from 10 to 90%, preferably 40 to 70% aerated ice confection particles, and the balance liquid. On a volume basis the amounts are about 20 to 90% aerated ice confection particles, preferably about 60 to 80%, and the balance liquid. Of course, a skilled artisan can conduct routine experiments to determine the optimum ratios to provide the specific type of beverage desired and the US or European consistencies or organoleptic properties.

In addition to the aerated ice confection particles, the container can also include other components to form the final product. For example, pieces of fruits, nuts, cereal, cookies or candies can be included in the container for inclusion in the final product. These pieces can be uniformly mixed into the particles so that they will be relatively uniformly provided in the final product. The size of these pieces can vary from about the same size as the aerated ice confection particles to larger sizes having about the same density as the aerated ice confection particles. Alternatively, these pieces can be provided in a separate container or in the lid and added to the frozen product after it is formed, wherein they can be provided on the upper surface or mixed into the product using a spoon or straw.

For certain drinks, small amounts of various flavor enhancers or modifiers, generally food grade acids, can be utilized to impart tartness, enhance flavor, prevent oxidation of the ingredients or the like. For example, citric acid and other organic acids such as malic acid may be utilized to impart tartness or accentuate the flavor of the mixture. These are generally present in the liquid but if necessary can be included with the aerated ice confection particles. Also, to prevent oxidation, ascorbic acid can be utilized.

EXAMPLES

The following examples are provided to illustrate the preferred embodiments of the invention.

Example 1

A conventional ice cream mix was manufactured using standard ingredients including milk, cream, sugars, stabilizers and emulsifiers as show below, then pasteurized and homogenized and stored in a flavor vat at 4° C. (40° F.). Mix making was followed by conventional freezing of mix into ice cream at a specified overrun of 50%. The drawing temperature of the frozen ice cream from the freezer ranged from −5° C. to −7° C. Next, the ice cream was formed into the shape of strands of approximately 1.5 cm diameter. It was further exposed to a cryogenic medium for rapid hardening at −15° C. to −20° C. The hardened mass was reduced in size by cutting the strands with a knife blade to aerated ice confection particles having the following specified weight and dimensions: approx. 0.5 to 3.0 grams wt, and 1.5 to 5 cm$^3$ with a principal diameter of about 1 to 2 cm, such that the particles have the approximate shape of the letter D.

After attaining the desired size, the aerated ice confection particles were further hardened in a cryogenic medium at −25° C. to −30° C. so that they can retain their dimensions without deforming and to provide a non-sticking form. In an additional and optional step, these hardened particles were coated with a predominantly aqueous liquid solution to form a glassy and non-sticking surface.

The particles were then exposed to a final cryogenic medium at about −30° C. to −35° C. for further hardening. The aerated ice confection particles in the form of a free-flowing, irregularly shaped particles were collected in containers and stored in a freezer at −25° C. to −30° C.

Compositions of aerated ice confections that can be used are as follows:

| Ingredient | Amount (wt %) |
| --- | --- |
| Cream | 15 to 35% |
| Condensed Skim Milk | 5 to 20% |
| Milk | 30 to 50% |
| Sugar | 10 to 25% |
| Sweet Whey | 1 to 6% |
| Corn Syrup Solids (36 DE) | 4 to 12% |
| Stabilizers and Emulsifiers | 0.1 to 1% |
| Total | 100% |

Frozen ice drinks in the form of milk shakes were prepared from this formulation as follows:

The aerated ice confection particles were mixed with milk in various proportions of 40:60, 50:50, 60:40, 70:30, 80:20 with respect to the milk. At each specific ratio, the final product achieved the desired characteristics for a traditional thick milk shake with the desired key attributes described below:

The product was thick, has a creamy mouth-feel, a desirable slightly grainy consistency, and optimum coldness, and no changes in this profile were observed even after holding the particles for 10-15 minutes at ambient temperature.

The temperature of final milk shake product during testing was around −2° C. to +2° C. immediately after preparation.

The temperature of the aerated ice confection particles during evaluation was around −16° C. to −20° C.

The attributes and property descriptions for milkshakes prepared as described above demonstrate that is very similar to those that are prepared in a conventional way.

What is claimed is:

1. A process for preparing aerated ice confection particles, the process comprising:
   preparing an elongated frozen stream of an aerated ice confection;
   freezing the stream cryogenically to a temperature below the glass transition temperature (Tg) of the aerated ice confection to form an amorphous glass-like solid mass that is not sticky and that has minimal surface-adhesive properties;
   comminuting the solid mass to free-flowing aerated ice confection particles;
   exposing the free-flowing aerated ice confection particles to cryogenic freezing in which the particles are subjected to a temperature of −25° C. to −30° C. to obtain hardened free-flowing aerated ice confection particles;

coating the hardened free-flowing aerated ice confection particles with an aqueous solution of a Tg elevating agent to form a glassy coating on the particles that contributes to free-flowing ability at storage temperatures, and the Tg elevating agent is a partially enzymatically degraded starch syrup having dextrose equivalents between 1 and 10 and a molecular weight of 5 kD to 15 kD; and exposing the coated hardened free-flowing aerated ice confection particles to a cryogenic freezing in which the particles are subjected to a temperature of −30° C. to −35° C. to form further hardened free-flowing aerated ice confection particles that have a Tg of −5° C. to −35° C.

2. The process of claim 1, wherein the elongated frozen stream of the aerated ice confection is made by extruding the aerated ice confection into one or more elongated shapes.

3. The process of claim 1, wherein the aerated ice confection is selected from the group consisting of an ice cream, frozen dairy dessert, sherbet, sorbet, and frozen juice.

4. The process of claim 1, wherein the elongated frozen stream of the aerated ice confection is cryogenically frozen by subjecting the stream to a temperature of −15° C. to −20° C.

5. The process of claim 1, wherein the solid mass is comminuted into particles by a step selected from the group consisting of cutting, grinding, crushing, chopping, shredding, and abrading the solid mass.

6. The process of claim 1, wherein the aerated ice confection particles formed by the comminuting have a high surface to volume ratio of about 1 to 5 cm2/cm3 with a maximum linear dimension of about 1 mm to 2 cm.

7. The process of claim 1 wherein the Tg elevating agent is applied to the hardened free-flowing aerated ice confection particles at a temperature below the Tg of the particles.

8. The process of claim 1 wherein the Tg elevating agent in the coating is enzymatically treated corn syrup.

9. The process of claim 1, comprising packaging the aerated ice confection particles in a container.

10. The process of claim 9, wherein the container is selected from the group consisting of a bag, bag, pouch and other sealed container which is sized to hold single or multiple servings.

11. The process of claim 9, wherein the container is a cup that includes a removable lid.

12. The process of claim 9, wherein the container is a lid that holds the aerated ice confection particles therein and can be placed on a cup to introduce the aerated ice confection particles into the cup.

13. The process of claim 1 wherein the hardened free-flowing aerated ice confection particles are exposed to the cryogenic freezing at a temperature of about −35° C. to form the further hardened free-flowing aerated ice confection particles.

14. A method of making a frozen ice drink, the method comprising:
preparing an elongated frozen stream of an aerated ice confection;
freezing the stream cryogenically to a temperature below the glass transition temperature (Tg) of the aerated ice confection to form an amorphous glass-like solid mass that is not sticky and that has minimal surface-adhesive properties;
comminuting the solid mass to free-flowing aerated ice confection particles;
exposing the free-flowing aerated ice confection particles to cryogenic freezing in which the particles are subjected to a temperature of −25° C. to −30° C. to obtain hardened free-flowing aerated ice confection particles;
coating the hardened free-flowing aerated ice confection particles with an aqueous solution of a Tg elevating agent to form a glassy coating on the particles that contributes to free-flowing ability at storage temperatures, and the Tg elevating agent is a partially enzymatically degraded starch syrup having dextrose equivalents between 1 and 10 and a molecular weight of 5 kD to 15 kD;
exposing the coated hardened free-flowing aerated ice confection particles to a cryogenic freezing in which the particles are subjected to a temperature of −30° C. to −35° C. to form further hardened free-flowing aerated ice confection particles; and
combining a sufficient amount of the further hardened free-flowing aerated ice confection particles with sufficient amounts of a liquid and mixing to form the drink.

15. The method of claim 14, wherein the aerated ice confection particles are present in an amount of about 10 to 90% based on the total amount of aerated ice confection particles and liquid.

16. The method of claim 14, wherein the aerated ice confection particles are present in a single serving size container to which the liquid is added and the mixing of the aerated ice confection particles and liquid is achieved by shaking of the container.

17. The method of claim 16, wherein the container includes a removable lid, the lid being removed prior to introduction of the liquid into the container.

18. The method of claim 14, wherein the liquid is selected from the group consisting of water, milk, fruit juice, coffee, tea, an alcoholic beverage, and a liquid beverage forming mix.

19. A method of making a single serving of a frozen ice drink which comprises:
providing a cup containing a single serving of a liquid;
adding aerated ice confection particles prepared by a process comprising
preparing an elongated frozen stream of an aerated ice confection,
freezing the stream cryogenically to a temperature below the glass transition temperature (Tg) of the aerated ice confection to form an amorphous glass-like solid mass that is not sticky and that has minimal surface-adhesive properties,
comminuting the solid mass to free-flowing aerated ice confection particles,
exposing the free-flowing aerated ice confection particles to cryogenic freezing in which the particles are subjected to a temperature of −25° C. to −30° C. to obtain hardened free-flowing aerated ice confection particles,
coating the hardened free-flowing aerated ice confection particles with an aqueous solution of a Tg elevating agent to form a glassy coating on the particles that contributes to free-flowing ability at storage temperatures, and the Tg elevating agent is a partially enzymatically degraded starch syrup having dextrose equivalents between 1 and 10 and a molecular weight of 5 kD to 15 kD, and
exposing the coated hardened free-flowing aerated ice confection particles to a cryogenic freezing in which the particles are subjected to a temperature of −30° C. to −35° C. to form further hardened free-flowing aerated ice confection particles; and mixing the further hardened aerated ice confection particles and liquid to form the drink.

20. A method of making a frozen ice drink which comprises providing a process for preparing aerated ice confection particles, the method comprising:
- preparing an elongated frozen stream of an aerated ice confection;
- freezing the stream cryogenically to a temperature below the glass transition temperature (Tg) of the aerated ice confection to form an amorphous glass-like solid mass that is not sticky and that has minimal surface-adhesive properties; and
- comminuting the solid mass to free-flowing aerated ice confection particles;
- exposing the free-flowing aerated ice confection particles to cryogenic freezing in which the particles are subjected to a temperature of −25° C. to −30° C. to obtain hardened free-flowing aerated ice confection particles;
- coating the hardened free-flowing aerated ice confection particles with an aqueous solution of a Tg elevating agent to form a glassy coating on the particles that contributes to free-flowing ability at storage temperatures, and the Tg elevating agent is a partially enzymatically degraded starch syrup having dextrose equivalents between 1 and 10 and a molecular weight of 5 kD to 15 kD;
- exposing the coated hardened free-flowing aerated ice confection particles to a cryogenic freezing in which the particles are subjected to a temperature of −30° C. to −35° C. to form further hardened free-flowing aerated ice confection particles; and
- combining a liquid with the further hardened aerated ice confection particles to form the drink.

21. The method of claim 20, packaging the aerated ice confection particles in a container wherein the container is selected from the group consisting of a bag, pouch or other sealed container which is sized to hold single or multiple servings, the liquid is provided in a cup and the aerated ice confection particles are added to the liquid in the cup with stirring to form the drink.

22. The method of claim 20, packaging the aerated ice confection particles in a container wherein the container is a cup which is sized to hold a single serving of the drink, and liquid is added to the aerated ice confection particles with stirring or shaking to form the drink.

23. The method of claim 22, wherein the cup includes a removable lid, the lid is removed prior to introduction of the liquid into the cup, and the lid is then replaced to allow shaking of the cup to mix the aerated ice confection particles with the liquid.

24. A method comprising:
- preparing an elongated frozen stream of an aerated ice confection;
- freezing the stream cryogenically to a temperature below the glass transition temperature (Tg) of the aerated ice confection to form an amorphous glass-like solid mass that is not sticky and that has minimal surface-adhesive properties;
- comminuting the solid mass to free-flowing aerated ice confection particles;
- exposing the free-flowing aerated ice confection particles to cryogenic freezing in which the particles are subjected to a temperature of −25° C. to −30° C. to obtain hardened free-flowing aerated ice confection particles;
- coating the hardened free-flowing aerated ice confection particles with an aqueous solution of a Tg elevating agent to form a glassy coating on the particles that contributes to free-flowing ability at storage temperatures, and the Tg elevating agent is a partially enzymatically degraded starch syrup having dextrose equivalents between 1 and 10 and a molecular weight of 5 kD to 15 kD;
- exposing the coated hardened free-flowing aerated ice confection particles to a cryogenic freezing in which the particles are subjected to a temperature of −30° C. to −35° C. to form further hardened free-flowing aerated ice confection particles.

25. The method according to claim 24, wherein the further hardened particles have a Tg of −5° C. to −35° C. and a high surface to volume ratio of about 1 to 5 cm2/cm3 with a maximum linear dimension of about 1 mm to 2 cm.

* * * * *